United States Patent
Rogers et al.

(10) Patent No.: US 9,659,435 B2
(45) Date of Patent: May 23, 2017

(54) SYSTEM AND METHOD FOR PROVIDING OFF-SITE ONLINE BASED GAMING

(75) Inventors: Arthur O. Rogers, Las Vegas, NV (US); Gavin Clarkson, Austin, TX (US)

(73) Assignees: Martha Atelia Clarkson, Austin, TX (US); Arthur O. Rogers, II, Las Vegas, NV (US)

( * ) Notice: Subject to any disclaimer, the term of this patent is extended or adjusted under 35 U.S.C. 154(b) by 129 days.

(21) Appl. No.: 13/188,672

(22) Filed: Jul. 22, 2011

(65) Prior Publication Data

US 2011/0287829 A1 Nov. 24, 2011

Related U.S. Application Data

(63) Continuation of application No. 13/112,168, filed on May 20, 2011, now abandoned.

(60) Provisional application No. 61/347,288, filed on May 21, 2010.

(51) Int. Cl.
    *A63F 9/24* (2006.01)
    *G07F 17/32* (2006.01)
    *A63F 13/352* (2014.01)

(52) U.S. Cl.
    CPC ........ *G07F 17/3223* (2013.01); *A63F 13/352* (2014.09); *G07F 17/3248* (2013.01)

(58) Field of Classification Search
    CPC .......................... A63F 13/352; G07F 17/3248
    USPC ...................................... 463/40, 42
    See application file for complete search history.

(56) References Cited

U.S. PATENT DOCUMENTS

| | | | | |
|---|---|---|---|---|
| 5,830,067 | A * | 11/1998 | Graves | G07F 17/32 273/269 |
| 6,306,038 | B1 | 10/2001 | Graves et al. | |
| 7,303,473 | B2 * | 12/2007 | Rowe | 463/42 |
| 8,272,959 | B2 * | 9/2012 | Yacenda | 463/42 |
| 2004/0014514 | A1 * | 1/2004 | Yacenda | 463/17 |
| 2008/0108426 | A1 * | 5/2008 | Nguyen et al. | 463/25 |
| 2008/0119284 | A1 * | 5/2008 | Luciano et al. | 463/42 |
| 2009/0093312 | A1 * | 4/2009 | Carlson | 463/42 |
| 2010/0169188 | A1 * | 7/2010 | Buchheit | G06Q 20/02 705/26.1 |
| 2012/0034963 | A1 * | 2/2012 | Yacenda | 463/13 |

OTHER PUBLICATIONS

Native American Bank, NA (http://www.nabna.com/about.shtml) ("NAB").*
Bank of America, NA (http://about.bankofamerica.com/en-us/our-story/where-we-are.html#fbid=489krW85lvp) ("BoA").*

* cited by examiner

*Primary Examiner* — Lawrence Galka
(74) *Attorney, Agent, or Firm* — Howard & Howard Attorneys PLLC

(57) ABSTRACT

A system and method for allowing wagers to be made on a game and awarding a payout as a function of an outcome of the game is provided. The game may played by a game server, located at a gaming facility, which is located at a predefined geographic location. A remote device may be provided at a location outside of the predefined geographic location. An agent, in communication with the game server and the remote device, may receive instructions from a patron via the remote device to place a wager on a game and for instructing the server to place the wager in response to receiving the instructions from the patron.

2 Claims, 1 Drawing Sheet

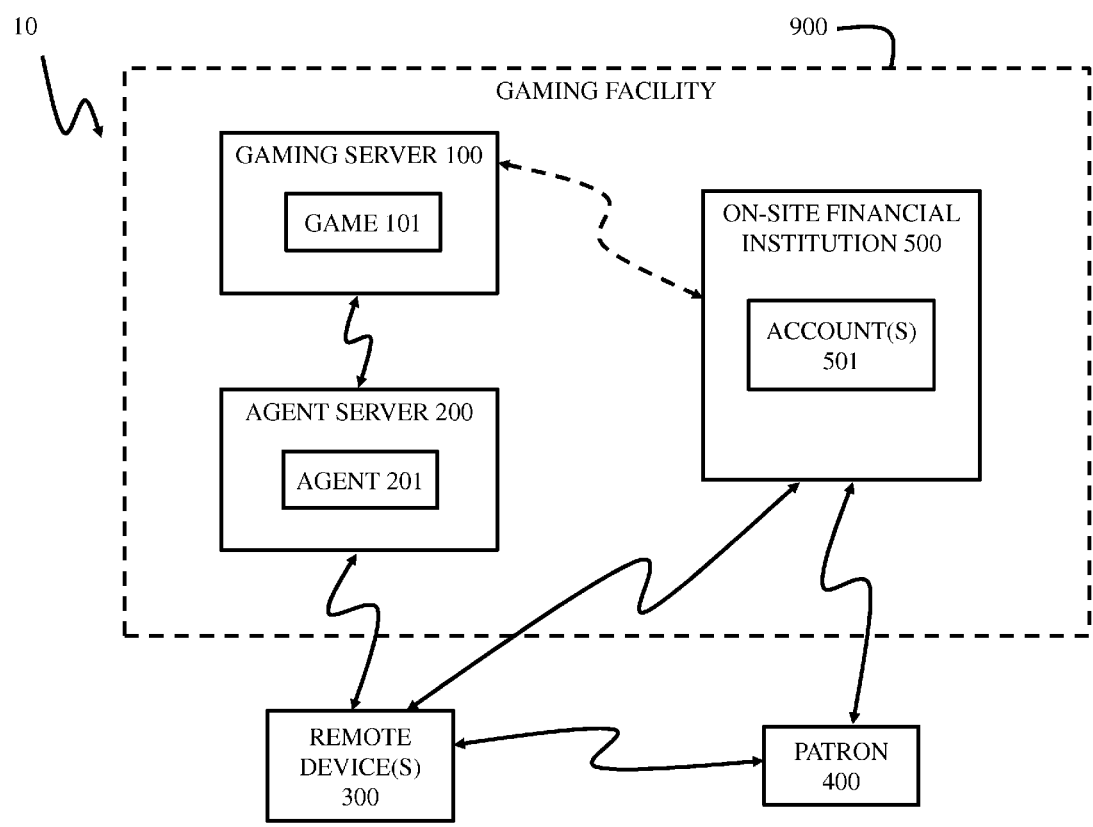

SYSTEM AND METHOD FOR PROVIDING OFF-SITE ONLINE BASED GAMING

CROSS-REFERENCE TO RELATED APPLICATIONS

The present application claims priority to U.S. Non-Provisional patent application Ser. No. 13/112,168, filed May 20, 2011, which claims priority to U.S. Provisional Patent Application Ser. No. 61/347,288, filed May 21, 2010, the entire disclosures of which are hereby incorporated by reference.

BACKGROUND OF THE INVENTION

The Indian Gaming Regulatory Act of 1988 (IGRA) regulates all Indian gaming today and provides the framework for the agreements that tribes and states negotiate to facilitate gaming. Meant to achieve "a principal goal of Federal Indian policy [which] is to promote tribal economic development, tribal self-sufficiency, and strong tribal government," the IGRA mirrors the Supreme Court's holding in *California v. Cabazon Band of Mission Indians* in stating that "Indian tribes have the exclusive right to regulate gaming activity on Indian lands if the gaming activity is not specifically prohibited by federal law and is conducted within a State which does not, as a matter of criminal law and public policy, prohibit such gaming activity."

The intention of IGRA was to provide the framework for gaming regulation on Indian reservations (or on certain tribal lands that are characterized as something other than a "reservation" such as restricted fee lands owned by tribes in New York or tribal jurisdictional areas in Oklahoma). To that end, Congress established an independent regulatory agency, the National Indian Gaming Commission (NIGC), with oversight authority to define and enforce national standards. Part of that standardization involved the classification of gaming operations:

1. Class I gaming encompasses traditional games used in ceremonial and social settings that are completely outside the scope of any but tribal regulation and control.
2. Class II gaming includes "the game of chance commonly known as bingo . . . including (if played in the same location) pull-tabs, lotto, punch boards, tip jars, instant bingo, and other games similar to bingo." Importantly, such games may still be defined as Class II even if they are played using a computer, an electronic device, or other technologic aid. Also included in Class II are card games "not explicitly prohibited" by the State, provided they are otherwise in conformity with all other State laws and regulations. Excluded from Class II are "banking card games" (e.g. baccarat, blackjack) and "electronic facsimiles of any game of chance or slot machines of any kind."
3. Class III gaming consists of all gaming that is not class I or II. This class includes so-called 'Vegas-style' games, such as house-banked card games, roulette, slot machines, and the like.

Class III gaming operations also must be "conducted in conformance with a Tribal-State compact."

The laws of agency play a crucial role in discussion of remote gaming. NIGC General Counsel Kevin Washburn summarized the applicability of agency law to tribal gaming interests in a 2000 NIGC opinion. Mr. Washburn summarized the applicability of the law of agency under the IGRA when he stated "IGRA contains no statutory prohibition on the use of agents to play the game of bingo. The bingo definition contained in IGRA requires only that the "holder of the card" cover the numbers. 25 U.S.C. §2703 (7)(A)(i)(II). The "holder" is not defined. The holder in [this instance] is either the player or the player's designated agent. Although the bingo definition in the NIGC regulations replaces the word "holder" with the word "player," this is a distinction without a difference when the law of agency is applied to the analysis. It is a fundamental tenet of the law of agency that the acts of the agent are deemed to be the acts of the principal. See 3 Am. Jur. 2D Agency §2 (1986); See also *Lubbock Feed Lots, Inc. v. Iowa Beef Processors, Inc.*, 630 F2d 250, 272 (5th Cir. 1980); *U.S. v. Sylvanus*, 192 F.2d 96, 108 (7th Cir. 1951); and *Lux Art Van Service, Inc. v. Pollard*, 344 F.2d 883, 887 (9th Cir. 1965). When the agent plays [the bingo game] for the player, the act of playing the card is deemed to be the act of the player/principal. The legal effect is that the agent is the player. Therefore, the use of agents violates neither IGRA's provision regarding the holder nor NIGC's regulations that discuss the player."

The present invention is aimed at one or more of the problems set forth above.

SUMMARY OF THE INVENTION

In a first aspect of the present invention, an agent computer system (which may include one or more servers, processors, memory devices, etc.) is installed on tribal land within the state of operation which will act as an agent on behalf of each individual patron/principal who wishes to engage in Class II gaming without being physically present on the tribal land;

In a second aspect of the present invention, a gaming computer system may be installed on tribal land for providing Class II gaming which is accessible to the agent and allows the agent to play on behalf of the patron/principal;

In a third aspect of the present invention, a financial institution or bank on tribal land in which the patron/principal will maintain an account accessible to the agent playing on behalf of the patron/principal, is provided. The agent may have access to withdraw money to place a wager in a game on the tribal land and deposit money to the patron/principal account all at the direction of the patron/principal; and In a fourth aspect of the present invention, a communication system on the tribal land which is capable of forming a communication link between the agent and gaming computer systems and a patron/principal's mobile or smartphone to enable an intrastate patron/principal (i.e., within Oklahoma) to receive or otherwise have access to a Class II game, and provide directions to an agent to facilitate play of the game on the patron/principal's behalf.

In a fifth aspect of the present invention, a remote gaming system leveraging off of a specific opinion from the National Indian Gaming Commission called National Indian Bingo. The system will provide off reservation participation in an on reservation gaming environment. The class II server is located within reservation boundaries. The Class II server will provide server-based gaming and so the patron/principal will basically be playing bingo via the agent.

In a sixth aspect of the invention, the game machines that the patron/principal interacts with are essentially dumb terminals and contain no game logic. The game logic is located on one or more game servers. Generally, the game machines present to the player a simulated game screen. In one embodiment, the game machines may be embodied in off the shelf-devices, such as personal computers, laptops, netbooks, mobile phones, PDA's, tablet or convertible computers, e.g., the iPod Touch, iPhone, and iPAD available from Apple as well as Android-based mobile phones and Blackberry phones.

In a seventh aspect of the present invention, the patron does not actually play the game. The patron engages an agent to play the game on their behalf. And they're not playing a slot machine. They're playing bingo. So the agent will be authorized to buy a bingo card, play the bingo card, deposit unused bingo cards in a virtual safe deposit box at the Tribal Financial Institution. The agent can either be an electronic agent, i.e., software, or a real person. In essence, the patron/principal instructs the agent to press the buttons to perform the desired actions, i.e. play the Class II game.

In an eighth aspect of the present invention, a system or method for allowing wagers to be made on a game and awarding a payout as a function of an outcome of the game may be provided. The game may played by a game server, located at a gaming facility, which is located at a predefined geographic location. A remote device may be provided at a location outside of the predefined geographic location. An agent, in communication with the game server and the remote device, may receive instructions from a patron/principal via the remote device to place a wager on a game and for instructing the server to place the wager in response to receiving the instructions from the patron/principal.

BRIEF DESCRIPTION OF THE DRAWINGS

Other advantages of the present invention will be readily appreciated as the same becomes better understood by reference to the following detailed description when considered in connection with the accompanying drawings wherein:

The FIGURE is a block diagram of a system which allows for off site online gaming through an agent, according to an embodiment of the present invention.

DETAILED DESCRIPTION OF THE INVENTION

With reference to the drawing, and in operation, a gaming system 10, which may be played or used by a patron/principal 400 is provided. In one aspect, the gaming system 10 allows the patron/principal 400 to remotely direct an agent 201 to place a wager on a game 101. The gaming system 10 plays the game and may award the patron 400 a payout based on the result of the game 101.

The gaming system 10 has three primary elements: a gaming server 100, and agent server 200, and a remote device 300 used by the patron/principal 400 to interact with the agent server 200.

In one embodiment, the gaming server 100 will host the game 101. In the illustrated embodiment, the game 101 is a Class II game based on the game of bingo.

The actual player of the game will be the agent 201. In the illustrated embodiment, the agent 201 is a software agent hosted on the agent server 200. However, it should be noted that the agent/player 201 can be either a software agent or a human.

The patron 400 will act as principal and will direct the agent/player 201 to play the class II game 101, the agent/player 201 will play the game 101 on behalf of the patron/principal 400, and then the agent/player 201 will report back to the patron/principal 400 the results of the game 101.

Each instantiation of a gaming operation will be on an intrastate basis only. For example, in each implementation, the gaming server 100, agent server 200, and the remote devices 300 (and thus, the patron(s) 400) are in the same state.

It should also be noted that the system 10 may include multiple gaming servers 100 and/or agent servers 200 in each instantiation.

There may also be multiple agent/players 201 per agent server 200. There may be multiple instantiations in multiple states, and the gaming servers 100 may be linked, but all gameplay will be on an intrastate basis only.

Technological safeguards may be in place to ensure that no activity happens across state borders.

In one aspect of the present invention, the gaming infrastructure (hardware and software) will be located within each state within the boundary of tribal lands 900 eligible for tribal gaming in an appropriately secure facility.

In operation, the patron/principal 400 will direct the placement of bets via the remote device 300.

In one aspect of the present invention, the remote device 300 could be any of a desktop, laptop, kiosk, mobile phone, or some other remote device.

It should be noted, that the patron/principal 400 will not bet directly via the device 300. Communication between the patron/principal 400 and the agent 201 and the agent server 200 will never be across state lines, as all communication will be on an intrastate basis only.

Each gaming operation may feature a wide variety of games 101 hosted on the gaming server 100 such as instant "scratchies," slot games, table games and/or other common forms of gambling activities.

In one aspect of the present invention, the games 101, despite their appearance, will conform to Class II requirements. Representations of those games may also appear on the remote devices 300 as a means of communicating with the agent 201 and agent server 200, but all logic and gameplay will remain on the gaming server 100.

Another aspect of the system may involve the use of an On-Reservation Financial Institution ("ORFI") 500. If allowed by law, the Financial Institution may also be off reservation.

Each patron/principal 400 may maintain an account 501 at the ORFI 500 and will deposit and withdraw funds from that account 501 from time to time.

Funds may be maintained in the form of cash or some sort of cash equivalent, including bingo cards. Each ORFI 500 will be able to handle multiple accounts 501 for multiple patron/principals 400.

The patron/principal 400 will direct the agent/player 201 to play a game on behalf of the patron/principal 400 using the remote device 300. The agent 201 will access the funds in the account 501 belonging to the patron/principal 400 and direct those funds to the gaming server 100 in order to play a game 101. The results of the game 101 and any winnings will be transferred from the gaming server to the agent/player 201 at the agent server 200. The agent/player 201 will then either temporarily hold any winnings for subsequent play on behalf of the patron/principal 400 or transfer the winnings back to the account 501.

In an alternative embodiment, the funds to be transferred directly between the gaming server 100 and the account 501 under the direction of the agent/player 201, as represented by the dashed line in the FIGURE. The agent/player 201 will send an indication of the result of the game 101 to the remote device 300, either directly or via the agent server 200.

INDUSTRIAL APPLICABILITY

With respect to the FIGURE, and in operation, the system 10 will be a variant of an on-reservation Class II operation.

The operator, i.e., the tribe, sets up a server or servers 100 to perform or play Class II and possibly Class III games 101. The system 10 includes a number (X) of machines 300. The machines 300 are remote terminals connected to an agent 201, which interacts with the server 100 for the server based Class II and/or Class III games 101. Winnings can be paid in bingo tickets, credits, cash, things of monetary value which can later be cashed in.

An on-site or on-reservation financial institution 500, e.g. (ORFI), analogous to a local community bank is established. A patron 400 may open an account at the ORFI/bank 500, deposit money in the ORFI/bank 500 and direct the agent 201 to withdraw money from ORFI/bank 500 to then purchase bingo tickets. Alternatively, the patron 400 may purchase the bingo tickets and give the tickets to the agent 201.

A third possibility is to purchase the tickets, credits, cash, things of monetary value and place them in an actual and/or virtual safe deposit box, i.e., account 501, at the ORFI/bank 500. At the direction of the patron 400, the agent 201 can then withdraw the bingo tickets, credits, cash, things of monetary value play them, and deposit unused bingo tickets and/or winnings back into the actual and/or virtual safe deposit box 501.

The patron 400, using a remote terminal 300, interacts with the agent 201 who then plays the bingo-based Class II games on the patron's behalf.

Winnings may be paid rather than in bingo tickets, which would be deposited into the ORFI/bank 500.

In one aspect, winnings may be paid in (more) bingo cards. The (unused) bingo cards, which have value, may be deposited.

For example, each bingo card might be worth a dollar. The patron 400 instructs the agent 201 to purchase ten bingo cards. The agent 201 buys the bingo cards on behalf of the patron 400. Each patron 400 has a virtual safe deposit box, i.e., their account 501, where they can store their unused bingo cards. The patron 400 may instruct the agent 201 to play their bingo card.

If the patron 400 wins 10 bingo cards, the patron way instruct the agent 201 to put them in my virtual safe deposit box. When the patron 400 wants to play again, the patron 400 instructs the agent 201 to obtain a number of bingo cards from their account 501 and play them.

Once the agent 201 plays the bingo cards on behalf of the patron 400, the agent 201 informs the patron 400 how much the patron 400 won or lost. The agent 201 at a minimum is playing the game 101 and interacting with the safe deposit box 501. The agent logic or software may be located at the terminal 300, i.e., game machine, or on the game server 100, or on some other server or computer 200. However, the agent 400 will always be on the reservation.

The agent 400 may be paid a fee. In one embodiment of the present invention, the agent's fee is taken out of the hold percentage or fee, e.g., 1% of the hold.

In one embodiment the agent is an employee of the casino or tribe. The agent may alternatively be a third party or an employee of a third party. Alternatively, the agent may be a computer software agent which may reside or operate on a computer owned by the casino or tribe or a third party.

The patron may sell their bingo cards. There's a market for bingo tickets on the reservation. The server operator will buy and sell bingo tickets.

There may a transaction cost to the patron for selling their bingo cards.

What is claimed is:

1. A system, comprising:
   a game server, located at a gaming facility, for playing an electronic game, the electronic game being bingo, a game similar to bingo, or a bingo simulation, or a sweepstakes, the game server for allowing wagers to be made on the electronic game and for awarding a payout as a function of an outcome of the electronic game, the gaming facility being located at a predefined geographic location, the predefined geographic location being within a larger geographic area;
   a financial institution having a database for storing account information associated with a patron in a patron account, the patron being able to deposit and withdraw funds from the patron account;
   a remote device, located outside of the predefined geographic location and within the larger geographic area;
   an agent server coupled between the game server and the remote device, the agent server a computer-based software agent/player being configured to communicate with the remote device and the game server, the agent/player being configured to receive instructions from a patron via the remote device to play the electronic game without interaction between the patron and the game server, the agent/player being configured to access the patron account and automatically transfer funds from the patron account to the game server in response to receiving instructions from the remote device to participate in the electronic game on behalf of the patron, the agent/player being configured to instruct the server to place a wager in response to the agent/player having received the instructions from the patron, the agent/player being configured to receive the payout, if any, from the game server and notifying the patron of the outcome and any payout, wherein no other interaction occurs between the patron and the game server, the agent/player being further configured to ensure that no communication occurs over a border defined by the larger geographic area;
   wherein wagers and payouts are made with a cash substitute; and
   wherein the cash substitute is bingo card(s).

2. A method, comprising the steps of:
   playing an electronic game by a game server, the electronic game being bingo, a game similar to bingo, a bingo simulation, or a sweepstakes, the electronic game being located at a gaming facility within a predefined geographic location, the predefined geographic location being within a larger geographic area;
   providing a remote device located outside the predefined geographic location and within the larger geographic area;
   providing computer-based software agent/player, hosted on an agent server, the agent server being coupled between the game server and the remote device and the agent/player being configured to communicate with the remote device and the game server;
   storing, in a database at a financial institution, account information associated with a patron in a patron account;
   allowing the patron to deposit and withdraw funds from the patron account;
   allowing the patron to instruct the agent/player, via the remote device, to play the electronic game without interaction between the patron and the game server;

accessing, by the agent/player, the player account and automatically transferring funds from the patron account to the game server in response to receiving instructions from the remote device to participate in the electronic game on behalf of the patron;

automatically instructing, by the agent/player, the gaming server to participate in the electronic game and place a wager in response to receiving the instructions from the patron;

ensuring, by the agent/player, that no communication occurs over a border defined by the larger geographic area;

wherein wagers and payouts are made with a cash substitute; and wherein the cash substitute is bingo card(s).

* * * * *